(12) United States Patent
Nakazeki et al.

(10) Patent No.: US 6,390,681 B1
(45) Date of Patent: May 21, 2002

(54) DYNAMIC PRESSURE BEARING-UNIT (75) Inventors: Tsugito Nakazeki; Kazuo Okamura; Masakazu Hirata; Isao Komori, all of Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/539,617

(22) Filed: Mar. 31, 2000

(30) Foreign Application Priority Data

| Apr. 5, 1999 | (JP) | ............................................. 11-097919 |
| Apr. 6, 1999 | (JP) | ............................................. 11-099249 |

(51) Int. Cl.[7] ............................................. F16C 32/06
(52) U.S. Cl. ..................................................... 384/107
(58) Field of Search ................................. 384/100, 107, 384/111, 112, 113, 114, 121, 123, 124

(56) References Cited

U.S. PATENT DOCUMENTS

| 4,573,807 A | * | 3/1986 | Asada et al. ................. 384/100 |
| 5,357,163 A | * | 10/1994 | Minakuchi et al. ..... 384/112 X |
| 5,524,986 A | * | 6/1996 | Leuthold et al. ............. 384/119 |
| 5,538,347 A | * | 7/1996 | Itoh et al. .................... 384/107 |
| 5,658,080 A | * | 8/1997 | Ichiyama .................... 384/112 |
| 5,788,379 A | * | 8/1998 | Reeve .......................... 384/41 |

\* cited by examiner

*Primary Examiner*—Thomas R. Hannon
(74) *Attorney, Agent, or Firm*—Arent Fox Kintner Plotkin & Kahn, PLLC (57) ABSTRACT

A dynamic pressure bearing-unit is provided, which includes a shaft member (2) with a shaft (2a) and a flange portion (2b), a radial bearing (10) for supporting the shaft member (2) in the radial direction, and a thrust bearing (11) for supporting the flange portion (2b) of the shaft member (2) in the direction of thrust. The radial bearing (10) and the thrust bearing (11) support the shaft member (2) by dynamic pressure action out of contact, respectively, and the shaft (2a) and the flange portion (2b) are constructed in one piece. In this case, dynamic pressure grooves of the thrust bearing (11) are provided on the end surface of the bearing member (7) or on the upper surface of the thrust support portion (13) opposite to the flange portion (2b).

10 Claims, 6 Drawing Sheets

| Solvent \ Resin | Vinyl acetate resin | Polyvinylformal | Polyvinylbutyral | Methyl methacrylate resin | Polystyrene | Nylon | Ethyl cellulose | Acetylbutyl cellulose | Shellac (natural resin) | Acetyl cellulose |
|---|---|---|---|---|---|---|---|---|---|---|
| Carbon disulfide | | | | | ○ | | | | | |
| Morpholine | ○ | | ○ | | | | | ○ | ○ | ○ |
| Pyridine | ○ | ○ | ○ | | ○ | | | ○ | ○ | ○ |
| Nitro ethane | ○ | ○ | | | | | ○ | ○ | | ○ |
| Toluene | ○ | | ○ | | ○ | | ○ | | | |
| Cyclohexane | ○ | ○ | ○ | | | | ○ | ○ | | ○ |
| Acetone | ○ | | | | | | ○ | | | ○ |
| 2-ethoxy ethanol | ○ | | ○ | | | | ○ | ○ | ○ | |
| Dioxane | ○ | ○ | ○ | | ○ | | ○ | ○ | | ○ |
| m-cresol | ○ | ○ | ○ | | | ○ | ○ | ○ | | ○ |
| Butyl acetate | ○ | | ○ | ○ | ○ | | ○ | ○ | | |
| Methyl acetate 12% ethanol | ○ | | ○ | | ○ | | ○ | ○ | | |
| Methyl acetate | ○ | | ○ | ○ | ○ | | ○ | ○ | | |
| Isopropyl alcohol | ○ | ○ | | | | | ○ | | ○ | |
| N-butanol | ○ | ○ | | | | | ○ | | ○ | |
| 95% ethanol | ○ | ○ | | | ○ | | | | ○ | |

Fig. 10 (RELATED ART)

DYNAMIC PRESSURE BEARING-UNIT

BACKGROUND OF THE INVENTION

The present invention relates to a dynamic pressure bearing-unit and a method for manufacturing the same. The bearing unit is suitable particularly for supporting spindles of spindle motors of information equipment, for example, magnetic disk units for such as HDD and FDD, optical disk units for such as CD-ROM and DVD-ROM, and magneto-optical disk units for such as MD and MO. The bearing unit is also suitable for supporting spindles of polygon scanner motors of laser beam printers (LBP).

The spindle motors of the various types of the aforementioned information equipment require highly accurate revolution as well as high speed, low cost, and low noise. One of the components responsible for the performance required is the bearing for supporting the spindle of the motor. These days, as a bearing of this type, dynamic pressure bearings with outstanding properties to meet the aforementioned requirements for performance have been studied or in practical use.

Figure 10:
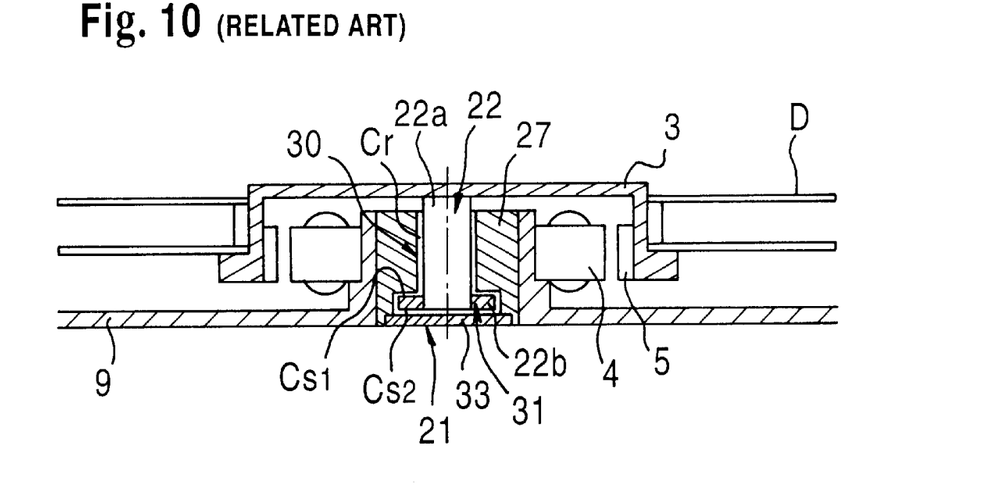
FIG. 10 shows a cross-sectional view of a conventional spindle motor that is used in information equipment.

FIG. 10 shows an example of a spindle motor of this type. The motor has a configuration in which a shaft member 22 (comprising a shaft 22a and a thrust disk 22b which becomes a flange portion when attached to the shaft 22a) rotatably supported by means of a bearing unit 21 is rotatably driven by means of the magnetic force produced between a motor stator 4 fixed to a bearing member 27 and a motor rotor 5 mounted to the shaft member 22. The bearing unit 21 is provided with a radial bearing 30 for supporting the shaft member 22 in the radial direction and a thrust bearing 31 for supporting the thrust disk 22b in the direction of thrust. Both the radial bearing 30 and 31 are dynamic pressure bearings which have grooves (dynamic pressure grooves) for producing a dynamic pressure on the bearing surfaces. The dynamic pressure grooves of the radial bearing 30 are formed on the inner periphery of the bearing member 27. On the other hand, the dynamic pressure grooves of the thrust bearing 31 are formed on the both end surfaces of the thrust disk 22b fixed to the lower end of the shaft member 22. The bearing member 27 is provided, on the bottom portion thereof, with a step portion having the depth of the thickness of the thrust disk 22b plus the width of the thrust bearing clearance (t=approximately 5 to 20 $\mu$m). A back metal 33 is incorporated into this step portion, thereby forming thrust bearing clearances Cs1, Cs2 having the aforementioned predetermined depth on the both axial sides of the thrust disk 22b (t=Cs1+Cs2).

The bearing unit 21 is assembled as follows. First, the thrust disk 22b and the back metal 33 are incorporated into the bearing member 27. After that, the shaft 22a with a radius smaller than the inner radius of the bearing member 27 by radial bearing clearance Cr is inserted into the inner diameter portion of the bearing member 27. Then, the distal end of the shaft 22a is press-fitted to the inner diameter portion of the thrust disk 22b. It may adopt another process that the back metal 33 is incorporated into the bearing body 27 after the shaft member 22 assembled the shaft and thrust disk 22b is inserted into the bearing body 27.

In the aforementioned bearing unit 21, inaccuracy of the perpendicularity between the shaft 22a and the thrust disk 22b would cause the thrust disk 22b to contact with the surfaces opposite thereto in the thrust bearing clearances Cs1, Cs2 and thus the bearing performance to deteriorate. Therefore, in the assembly process, it is necessary to press-fit the shaft 22a to the thrust disk 22b with accuracy, however, the press-fitting hardly provides the accuracy required (of the order of 2 $\mu$m in perpendicularity). Moreover, since the shaft 22a and the thrust disk 22b have been already incorporated into the unit, measurement of the perpendicularity or a check of the accuracy would be usually difficult. Even if possible, the measurement or the check would require time-consuming work, resulting in an increase in assembly cost.

Furthermore, in the aforementioned bearing unit, the dynamic pressure grooves on the both end surfaces of the thrust disk 22b can be formed by means of presswork at low cost. However, the dynamic pressure grooves of the inner periphery of the bearing member 27 need to be formed by means of purpose-built high-accuracy equipment to meet individual shapes of the bearing member 27, thereby raising the manufacturing cost. In addition, this structure requires time-consuming work such as measurement of dimensions to improve the accuracy of the bearing clearances of the thrust bearing, causing a concern to rise about an increase in cost due to an increase in labor.

SUMMARY OF THE INVENTION

In view of the aforementioned problems, a main object of the present invention is to reduce the cost required for manufacturing a dynamic pressure bearing-unit as well as improve the accuracy thereof. More specifically, a first object is to provide a dynamic pressure bearing-unit which can provide improved accuracy between the shaft and the thrust disk (such as perpendicularity) at low cost. A second object is to facilitate setting the bearing clearances (the thrust bearing clearances) of the thrust bearing as well as to implement highly accurate thrust bearing clearances.

In order to achieve the aforementioned first object, in a dynamic pressure bearing-unit comprising a shaft member composed a shaft and a flange portion, a radial bearing portion for supporting the shaft member in a radial direction, and a thrust bearing portion for supporting the flange portion of the shaft member in the direction of thrust, wherein the radial bearing portion and the thrust bearing portion support the shaft member by dynamic pressure action out of contact, respectively, the dynamic pressure bearing-unit according to the present invention is provided with the shaft and the flange portion which are constructed in one piece.

Such integrated structure of the shaft member readily can ensure accuracy such as the perpendicularity between the shaft and the flange portion. Moreover, the perpendicularity can be measured before the shaft and the flange portion are incorporated into the bearing unit, thereby facilitating accuracy measurement and the check thereof.

The radial bearing of the dynamic pressure bearing-unit is configured in such a manner that a bearing member is arranged along the outer periphery of the shaft member, and a radial bearing clearance of the radial bearing portion is formed between the outer periphery of the shaft member and the bearing member facing thereto.

The thrust bearing portion is to have two thrust bearing clearances on both sides of the flange portion. In this case, one end surface of the flange portion and the bearing member facing thereto (for example, the end surface thereof) can form one of the thrust bearing clearances of the thrust bearing portion. Moreover, a thrust support portion can be provided opposite to the other end surface of the flange portion, thereby allowing the thrust support portion and the other end surface of the flange portion to form the other one of the thrust bearing clearances of the thrust bearing portion.

The dynamic pressure grooves of the thrust bearing are preferably formed on either one of the bearing member and the thrust support portion (which is determined depending on the direction of thrust load) or on the both.

One end of the bearing member is preferably sealed with a sealing member. A labyrinth seal is preferable as the sealing member.

According to the present invention described above, the integrated structure of the shaft member readily provides improved accuracy such as the perpendicularity between the shaft and the flange portion, facilitating the accuracy measurement and the check thereof. Therefore, it is made possible to provide an inexpensive high-accuracy bearing unit suitable for use in a spindle motor of information equipment.

Furthermore, the dynamic pressure grooves of the thrust bearing may be formed on either one of the bearing member and the thrust support portion or on the both. In this case, even when the shaft member is made of a hard material such as an iron-based material, the bearing member or the thrust support portion may be made of soft metal, sintered metal or the like, which facilitates forming the dynamic pressure grooves. Thus, this enables reducing the cost of forming the thrust bearing surface.

In order to achieve the aforementioned second object, the dynamic pressure bearing-unit according to the present invention comprises a housing, a bearing member fixed to the housing, a shaft member, and a radial bearing portion and a thrust bearing portion which make use of dynamic pressure action produced at the time of relative rotation between the shaft member and the bearing member to conduct non-contact support of the shaft member. The aforementioned housing has a straight inner periphery in the shape of a cylinder with a bottom, and bearing clearances of the thrust bearing portion can be appropriately set by controlling a position of the bearing member relative to the housing.

Such a cylindrical housing integrated with a bottom (a bag-shaped housing) with a separate bearing member accommodated in the housing allows dynamic pressure grooves to be formed on the bearing member (particularly on the inner periphery thereof) by means of plastic work. This enables achieving high accuracy and low cost. Moreover, the bearing member can be formed in a simple shape without a step portion, for example, in the cylindrical shape, thereby facilitating handling the bearing member at the time of forming dynamic pressure grooves. When the bearing is incorporated into the housing, it is made possible to obtain readily thrust bearing clearances having appropriate widths with high accuracy by controlling the position at which the bearing member is fixed to the housing and defining appropriately the relative position between the both (particularly, the relative position in the axial direction).

The bearing clearances of the thrust bearing portion can be formed by removing a positioning means for positioning the bearing member relative to the housing. Since the width of the clearances corresponds to the size of the positioning means (particularly, the axial size), appropriate bearing clearances (thrust bearing clearances) of an appropriate width can be formed by changing the shape, the size, or the like of the positioning means.

The aforementioned dynamic pressure bearing-unit is manufactured by accommodating the shaft member and the bearing member in the cylindrical housing with a bottom to form the aforementioned radial bearing and thrust bearing. At this time, the bearing clearances of the thrust bearing can be set to appropriate widths by controlling the position at which the bearing member is fixed to the housing. In this case, the thrust bearing clearances of a desired width can be obtained only by adjusting the position at which the bearing member is fixed to the housing, thereby enabling reducing the manufacturing cost and providing the bearing clearances with improved accuracy.

The position at which the bearing member is fixed to the housing can be controlled by means of a positioning means provided inside the housing for positioning the bearing member relative to the housing. The thrust bearing clearances of an appropriate width can be obtained easily by removing the positioning means after positioning has been completed.

For example, the positioning means may be formed of a resin layer. In this case, a method for removing the resin layer may be achieved by means of a solvent. In the case where the bearing member is positioned relative to the housing, particularly, in the axial direction by means of the resin layer, the bearing member is fixed in the housing to a position added by the thickness of the resin layer. Therefore, the subsequent removal of the resin layer with a solvent allows for forming a clearance (an axial clearance) of a width corresponding to the thickness of the resin layer between the bearing member and the housing. Thus, it is made possible to make use of the clearance as the bearing clearances of the thrust bearing.

Specifically, the aforementioned bearing member can be positioned, for example, with the shaft member and the resin layer being interposed between the bearing member and the bottom of the housing, and with the bearing member, the shaft member, the resin layer, and the bottom of the housing being in intimate contact with one another.

The resin layer may be formed in the shape of a sheet or in the shape of a film.

According to the present invention described above, the cost of manufacturing a dynamic pressure bearing-unit can be reduced and dynamic pressure grooves can be formed with high accuracy. In particular, since the thrust bearing clearances can be formed in a simple process with accuracy, it is made possible to seek for further cost reduction as well as improve the stability and reliability of operation.

These and other objects and advantages of the present invention will become clear from the following description with reference to the accompanying drawings.

BRIEF DESCRIPTION OF THE DRAWINGS

In the accompanying drawings.

DETAILED DESCRIPTION OF THE PREFERRED EMBODIMENTS

The embodiments of the present invention will be explained below with reference to FIGS. 1 to 9.

Figure 1:
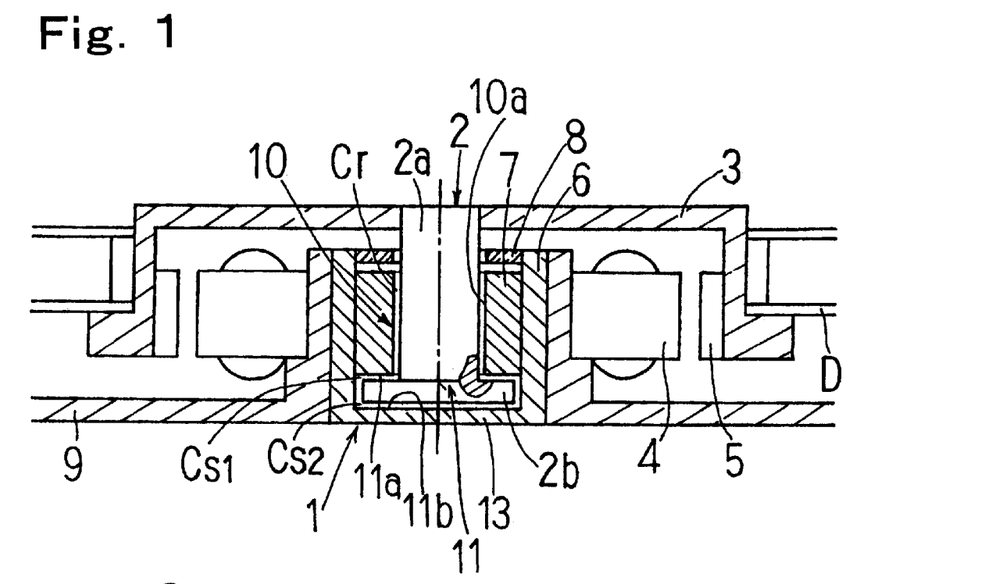
FIG. 1 shows a cross-sectional view of a spindle motor that is used in an information equipment with a dynamic pressure bearing-unit according to the present invention.

FIG. 1 is a cross-sectional view of a spindle motor for use in an information equipment provided with a dynamic pressure bearing-unit 1 according to the present invention, showing a spindle motor for use in a HDD (Hard Disk Drive) as an example. This spindle motor includes the bearing unit 1 for rotatably supporting a shaft member 2, a disk hub 3 mounted to the shaft member 2 and holding one or a plurality of magnetic disks D, and a motor stator 4 and a motor rotor 5 which are disposed facing to each other across a radial gap. The stator 4 is mounted to the cylindrical outer periphery of a casing 9 for holding the bearing unit 1, whereas the rotor 5 is mounted to the inner periphery of the disk hub 3. Energizing the stator 4 allows the rotor 5 to revolve due to the electromagnetic force induced between the stator 4 and the rotor 5, thus allowing the disk hub 3 and the shaft member 2 to revolve.

Figure 2:
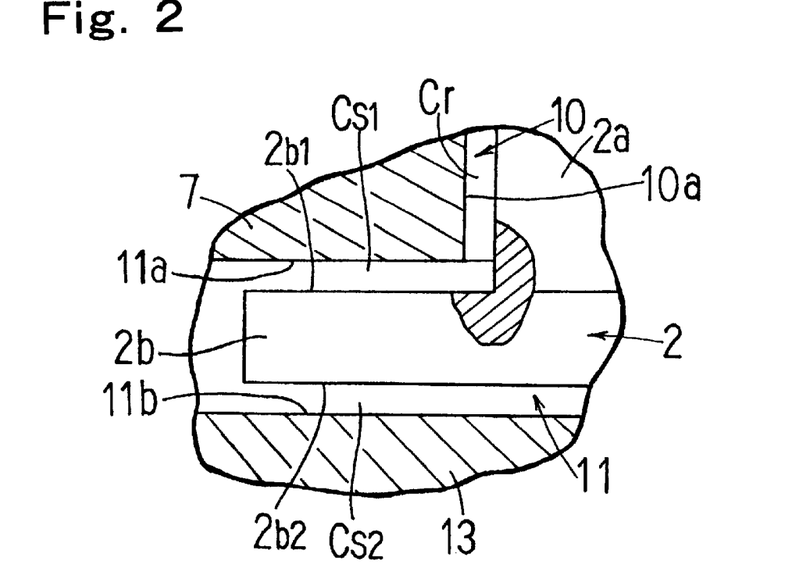
FIG. 2 shows an enlarged cross-sectional view of a main portion of FIG. 1.

As shown in FIGS. 1 and 2, the bearing unit 1 mainly includes the shaft member 2, a so-called cylindrical bag-shaped housing 6 with a bottom, a thick cylindrical bearing member 7 fixed to the inner periphery of the housing 6, and a sealing member 8 such as a sealing washer for sealing (preferably labyrinth sealing) one end of the bearing member 7 (referring to the opening side of the housing 6), as essential components. The shaft member 2 includes a shaft 2a and a flange portion 2b provided at the lower end of the shaft 2a, and is incorporated into the bearing unit 1 in such a manner that the shaft 2a is accommodated in the inner periphery portion of the bearing member 7 while the flange portion 2b is accommodated in between the bearing member 7 and the bottom of the housing 6.

The bearing member 7 is made of soft metal, for example, such as copper or brass. A radial bearing surface 10a having dynamic pressure grooves is formed on the inner periphery of the bearing member 7. During revolution of the shaft member 2 relative to the bearing member 7 (the revolution of the shaft member 2 in this embodiment), the dynamic pressure of a working fluid (such as oil) is generated in a radial bearing clearance Cr between the radial bearing surface 10a and the shaft 2a. Thus, a radial bearing 10 is formed which conducts the support of the shaft 2a in the radial direction out of contact. Incidentally, the width of the radial bearing clearance Cr in the figure is exaggerated for purposes of illustration (radial bearing clearances CS1, Cs2, which will be mentioned later are also illustrated in the same way).

The bearing member 7 can be formed not only of soft metal or the like but also, for example, of sintered metal. In this case, the dynamic pressure grooves can be formed at low cost and with high accuracy by means of compression molding. That is, the grooves in the shape of the projections and depressions corresponding to the shape of the dynamic pressure grooves (refer to FIG. 3(A)) of the radial bearing surface 10a are formed on the outer periphery of a core rod. Then, sintered metal is supplied to and pressed against the outer periphery of the core rod to transfer the dynamic pressure grooves, corresponding to the shape of the grooves on the core rod, to the inner periphery of the sintered metal. In this case, the sintered metal can be easily removed from the mold by making use of the spring-back of the sintered metal provided by releasing the pressure applied thereto. In the case of using sintered metal as the material of the bearing member 7 as such, a dynamic pressure oil-impregnated bearing can be formed by impregnating the bearing member 7 with a lubricant or lubricating grease.

At the both axial sides of the flange portion 2b, the thrust bearing clearances Cs1, Cs2 are provided in the axial direction. The thrust bearing clearance Cs1 is formed between the upper end surface 2b1 of the flange portion 2b and the end surface of the bearing member 7 opposite thereto. On the other hand, the other thrust bearing clearance Cs2 is formed between the lower end surface 2b2 of the flange portion 2b and the upper surface of a thrust support portion 13 opposite thereto. The present embodiment shows an example of the structure in which the thrust support portion 13 is formed to be integrated with the housing 6 and the thrust support portion 13 serves as a bottom portion to seal the other opening of the housing 6. Thrust bearing surfaces 11a, 11b, each having dynamic pressure grooves, are provided on the lower end surface of the bearing member 7 facing the one thrust bearing clearance Cs1 and on the upper surface of the thrust support portion 13 facing the other thrust bearing clearance Cs2, respectively. At the time of the afore-mentioned revolution, the dynamic pressure of a working fluid such as oil is generated in the thrust bearing clearances Cs1, Cs2, thus creating a thrust bearing 11 which conducts the support of the flange portion 2b in the both thrust directions out of contact.

Figure 3A:
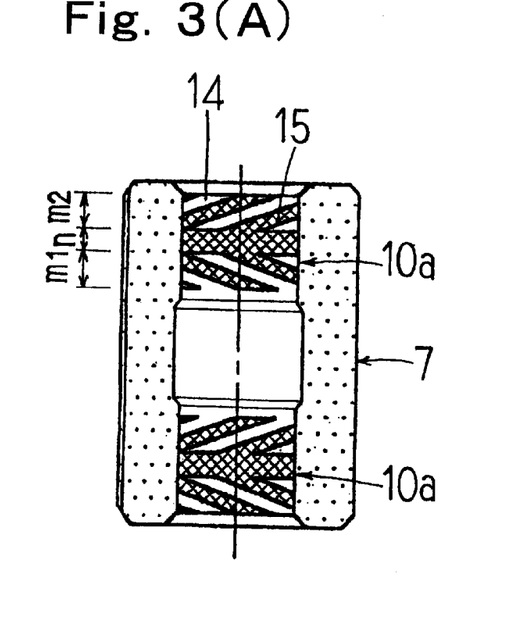
FIG. 3(A) shows a cross-sectional view of a bearing member.
Figure 3B:
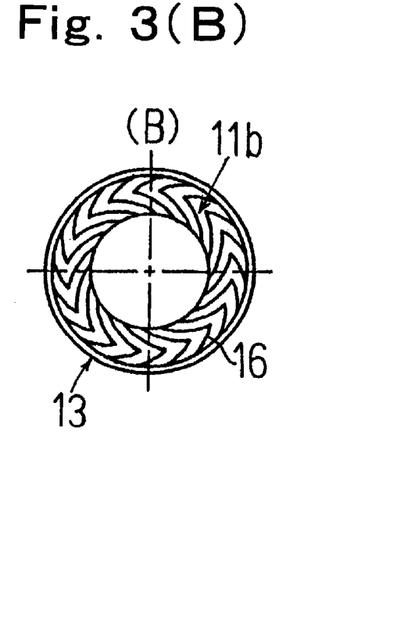
FIG. 3(B) is a plan view of a thrust bearing.

The shape of the dynamic grooves of the afore-mentioned radial bearing surface 10a and thrust bearing surfaces 11a, 11b can be selected arbitrarily. For example, any one of the publicly known types such as a herringbone type one, a spiral type one, a step type one, a multi-robe type one may be selected or may be combined as appropriate with another for use. FIGS. 3(A) and 3(B) shows the herringbone type one as an example of the shape of the dynamic pressure grooves; in which FIG. 3(A) shows the radial bearing surface 10a; and FIG. 3(B) shows the thrust bearing surface 11b provided on the thrust support portion 13. As shown in the drawing, the radial bearing surface 10a includes a first groove region m1 in which formed are dynamic pressure grooves 14 inclining in one direction; a second groove region m2 in which arranged are the dynamic pressure grooves 14 spaced apart from the first groove region m1 and inclining in the other direction; an annular flat portion n which is disposed between the two groove-regions m1, m2. The flat portion n and the back portion 15 of the dynamic pressure grooves 14 are formed at the same level. The dynamic pressure grooves 16 of the thrust bearing surface 11b are formed substantially in the shape of a letter V, provided with a bent portion substantially at the center thereof in the radial direction.

The aforementioned bearing unit 1 is assembled by inserting the shaft member 2 into the housing 6 with the flange portion 2b directed downward and further by press-fitting or adhering the bearing member 7 to a predetermined position on the inner periphery of the housing 6 so that the thrust bearing clearances Cs1, Cs2 of a predetermined width (approximately 5 to 20 $\mu$m) can be formed. Then, the spindle motor shown in FIG. 1 is assembled by press-fitting or adhering the bearing unit 1 to the cylindrical inner periphery of the casing 9 and further by press-fitting the assembly (a motor rotor) composed of the rotor 5 and disk hub 3 to the upper end of the shaft 2*a*.

In the present invention, the shaft 2*a* of the shaft member 2 and the flange portion 2*b* are formed in one piece, for example, by means of forging or machining. The shaft member 2 integrally formed as such allows for easily improving the accuracy such as the perpendicularity between the shaft 2*a* and the flange portion 2*b* and measuring the perpendicularity before being incorporated into the bearing unit, so that accuracy measurement and the check thereof can be performed easily. In addition, since the motor rotor can be mounted at the final stage, such advantages can be obtained that oil can be easily applied to the bearing unit 1 and the bearing unit 1 can be handled as a spindle unit to facilitate handling. Incidentally, the shaft member 2 can be fabricated by soldering the shaft 2*a* and the flange portion 2*b* in one piece, and thereafter finished to the predetermined accuracy.

The shaft member 2 is preferably made of an iron-based material with a high hardness since the shaft 2*a* is press-fitted with the motor rotor as described above. On the other hand, the iron-based materials makes it more difficult than ever to form the dynamic pressure grooves on the end surface of the flange portion 2*b* by the plastic working or machining, thus resulting in higher working cost. However, even in this case, a problem of this kind can be eliminated by providing the dynamic pressure grooves not on the flange portion 2*b*, as described above, but on the end surface of the bearing member 7 or on the thrust support portion 13. That is, the bearing member 7 and thrust support portion 13 can be made of soft metal or sintered metal (a material which facilitates plastic working or machining), thereby reducing the working cost. For example, the thrust bearing surfaces 11*a*, 11*b* with the dynamic pressure grooves 16 can be formed by pressing in the case of using soft metal and by the same compression molding as for the radial bearing surface 10*a* in the case of using sintered metal. Incidentally, if the working cost presents no particular problem, the aforementioned thrust bearing surfaces 11*a*, 11*b* can also be formed on the both end surfaces of the flange portion 2*b*.

Figure 4:
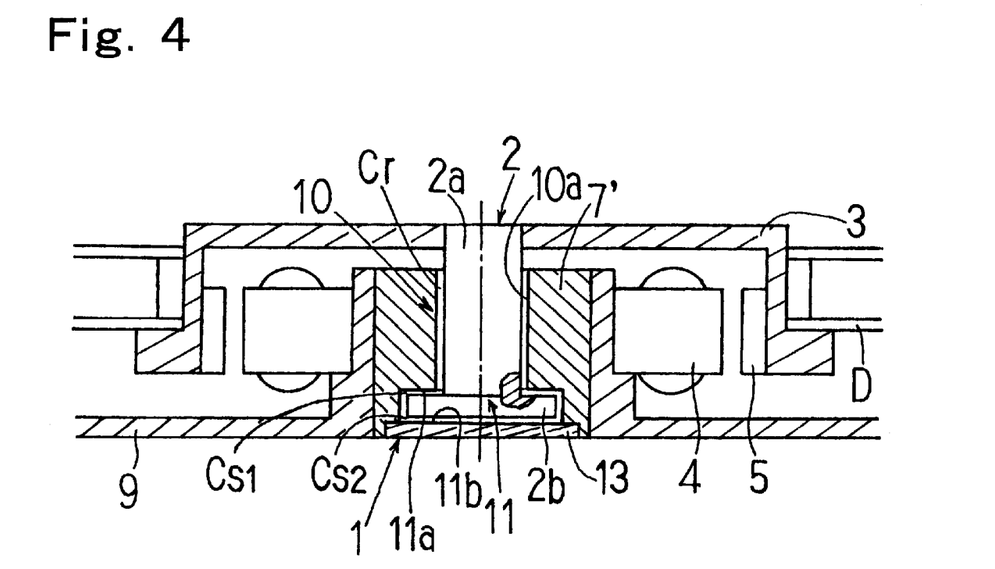
FIG. 4 shows a cross-sectional view of another embodiment of the present invention.

FIG. 4 shows a second embodiment of the present invention. Corresponding to the structure shown in FIG. 5, the bearing unit 1 has a single-piece bearing member 7' formed by integrating the housing 6 with the bearing member 7, shown in FIG. 1. The bottom opening of said bearing member 7' is adapted to be sealed by means of a separate member or the thrust support portion 13 (for example, with the same back metal 33 as the conventional one). Other configurations are substantially the same as those of FIGS. 1–3. Even in this case, the shaft member 2 can be formed in one piece and the thrust bearing surfaces 11*a*, 11*b* can be provided on the end surface of the bearing member 7' and on the thrust support portion 13, respectively.

A third embodiment of the present invention is to be explained below with reference to FIGS. 5–9.

Figure 5:
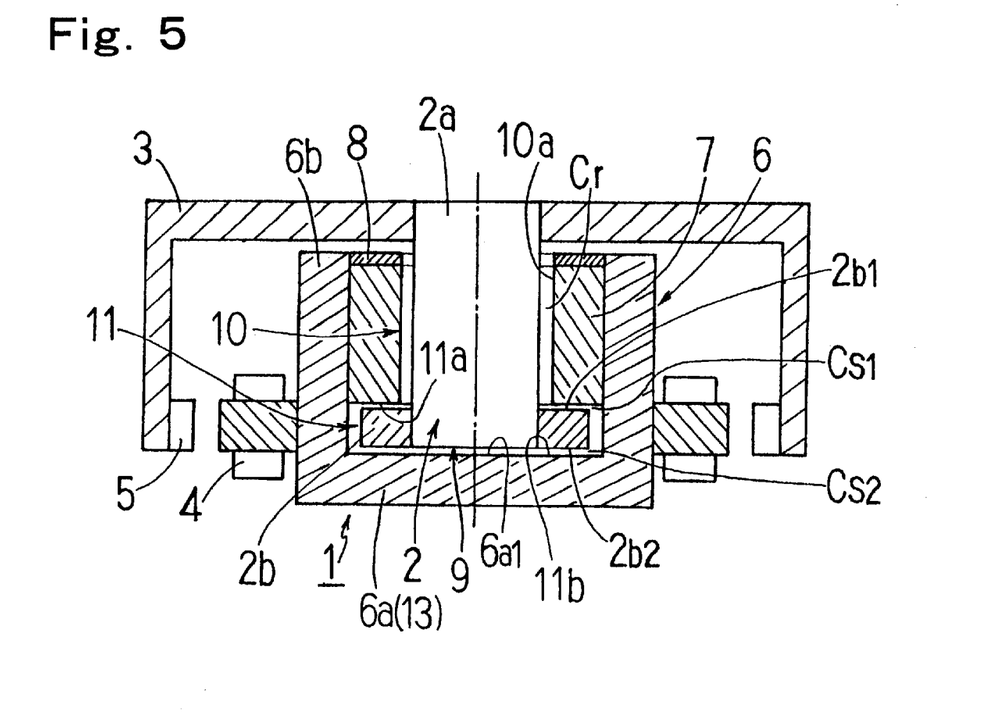
FIG. 5 shows a cross-sectional view of a spindle motor with a dynamic pressure bearing-unit according to the present invention.

FIG. 5 is a cross-sectional view of a spindle motor for an information equipment with a dynamic pressure bearing-unit 1 according to the present invention. This spindle motor includes the bearing unit 1 for rotatably supporting the shaft member 2, the disk hub 3 mounted to the shaft member 2 and holding one or a plurality of magnetic disks (not shown), and the motor stator 4 and the motor rotor 5 which are disposed facing to each other across a radial gap. The stator 4 is mounted to the outer periphery of the housing 6 of the bearing unit 1, whereas the rotor 5 is mounted to the inner periphery of the disk hub 3. Energizing the stator 4 allows the rotor 5 to revolve due to the electromagnetic force induced between the stator 4 and the rotor 5, thus allowing the disk hub 3 and the shaft member 2 to revolve.

The bearing unit 1 includes the shaft member 2, the cylindrical bag-shaped housing 6 with a bottom, the thick cylindrical bearing member 7 fixed to the inner periphery of the housing 6, and the sealing member 8 for sealing (preferably labyrinth sealing) one end of the bearing member 7 (referring to the opening side of the housing 6), as essential components. That is, the bearing unit 1 has a configuration in which the housing 6 is cylindrical and integrated with the bottom thereof, and the separate bearing member 7 is fixed to an inner diameter portion of the housing 6. Unlike the conventional bearing member 27 shown in FIG. 10, the housing 6 has a straight inner periphery with no steps present thereon which is formed in the same inner diameter from the opening portion to the bottom. The shaft member 2 includes the shaft 2*a* and the flange portion 2*b*. The flange portion 2*b* is formed either by fixing a bored disk-shaped thrust disk onto the lower end portion of the shaft 2*a* by means of press-fitting or the like or, as in FIG. 1, by integrating the shaft 2*a* with the flange portion 2*b*. The shaft member 2 is arranged such that the shaft 2*a* is accommodated in the inner diameter portion of the bearing member 7 while the flange portion 2*b* is accommodated in an axial space 9 between the bearing member 7 and the bottom 6*a* of the housing 6. There are axial clearances (thrust bearing clearances Cs1, Cs2) between the flange portion 2*b* and the bearing member 7 and between the flange portion 2*b* and the housing bottom 6*a* that becomes the thrust bearing 11, thereby making the shaft member 2 movable in the axial direction.

For example, the bearing member 7 is made of soft metal or an alloy (for example, copper, brass or the like). The radial bearing surface 10*a* having dynamic pressure grooves is formed on the inner periphery of the bearing member 7 or on the outer periphery of the shaft 2*a* (on the inner periphery of the bearing member 7 in the drawing). During revolution of the shaft member 2, a dynamic pressure effect is generated in a radial bearing clearance Cr (the annular clearance between the radial bearing surface 10*a* and the outer periphery of the shaft 2*a*). Thus, the radial bearing 10 is formed which conducts rotatably the non-contact support of the shaft 2*a*. The bearing member 7 can be formed not only of soft metal or the like but also, for example, of sintered metal. In this case, the dynamic pressure grooves can be formed at low cost and with high accuracy by means of compression molding. That is, the grooves in the shape of the projections and depressions corresponding to the shape of the dynamic pressure grooves (refer to FIG. 3 (A)) of the radial bearing surface 10*a* are formed on the outer periphery of a core rod. Then, sintered metal is supplied to and pressed against the outer periphery of the core rod to transfer the dynamic pressure grooves, corresponding to the shape of the grooves on the core rod, to the inner periphery of the sintered metal. In this case, the sintered metal can be readily removed from the mold by making use of the spring-back of the sintered metal provided by releasing the pressure applied thereto. In the case of using sintered metal as the material of the bearing member 7 as such, a dynamic pressure oil-impregnated bearing that possesses oil therein can be formed by impregnating the bearing member 7 with a lubricant or lubricating grease.

The thrust bearing 11 for thrust-supporting the shaft member 2 is configured by providing the thrust bearing surfaces 11*a*, 11*b* having dynamic pressure grooves on the end surface of the bearing member 7 opposite to the flange portion 2b and on the housing bottom 6a1. This configuration will allow the revolution of the shaft member 2 to produce a dynamic pressure in the thrust bearing clearance Cs1 which the one thrust bearing surface 11a faces and in the thrust bearing clearance Cs2 which the other thrust bearing surface 11b faces, respectively. Accordingly, the flange portion 2b is supported by the lower end surface of the bearing member 7 and the housing bottom 6a1 with no contact therewith, respectively, and thus the shaft member 2 is thrust-supported from the both sides in the axial direction. Incidentally, one or both of the thrust bearing surfaces 11a, 11b can also be provided either on one end surface of the flange portion 2b or on the both surfaces 2b1, 2b2.

The width of the thrust bearing clearances Cs1, Cs2 is appropriately set by controlling the position for fixing the bearing member 7 to the housing 6, particularly, by controlling the axial position. In other words, the bearing member 7 is fixed to the housing 6 at the position where the thrust bearing clearance of an appropriate width is formed. Specific means for this will be described later.

The shape of the dynamic grooves of the radial bearing surface 10a and thrust bearing surfaces 11a, 11b can be selected arbitrarily. Any one of the publicly known types such as the herringbone type one, the spiral type one, the step type one, the multi-robe type one may be selected or may be combined as appropriate with another for use. FIGS. 3(A) and 3(B) show the herringbone type one as an example of the shape of the dynamic pressure grooves.

At the time of assembling the aforementioned bearing unit 1, the width of the thrust bearing clearances Cs1, Cs2 is set according to the following procedures.

Figure 6:
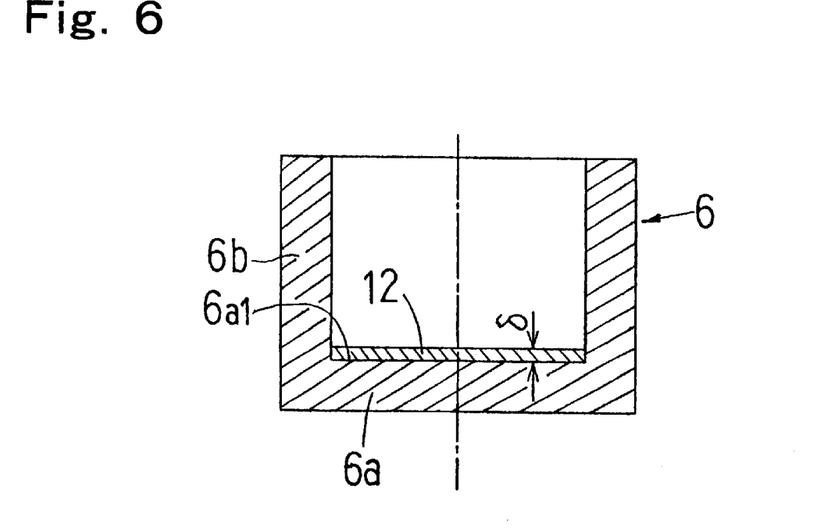
FIG. 6 is a cross-sectional view of the aforementioned dynamic pressure bearing-unit, showing a manufacturing procedure thereof.
Figure 7:
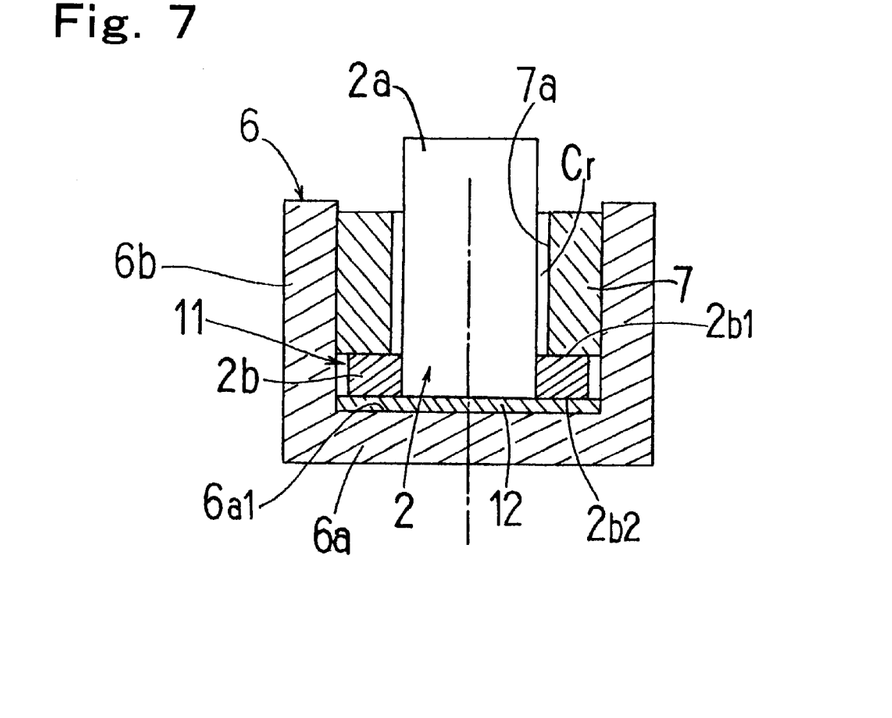
FIG. 7 is a cross-sectional view of the aforementioned dynamic pressure bearing-unit, showing a manufacturing procedure thereof.

First, as shown in FIG. 6, a resin layer 12 is formed as a positioning means in the housing 6, for example, on the bottom 6a1. The resin layer 12 is formed, for example, by laying a resin sheet on the housing bottom 6a1. The resin sheet 12 may have a thickness δ of the order of the sum of the thrust bearing clearances Cs1, Cs2 (Cs1+Cs2) and may be laid all over the housing bottom 6a1 or on part thereof. Subsequently, as shown in FIG. 7, the shaft member 2 is inserted into the inner diameter portion of the housing 6. Then, the bearing member 7 is pushed into the inner diameter portion of the housing 6 until the lower end surface of the bearing member 7 comes into contact with the upper end surface 2b1 of the flange portion 2b. The lower end surface of the bearing member 7, the both end-surfaces 2b1, 2b2 of the flange portion 2b, the resin sheet 12, and the housing bottom 6a1, one facing another, are brought into contact with one another. This allows the bearing member 7 to be axially positioned relative to the housing 6, so that the bearing member 7 is rigidly attached to the inner periphery of the housing 6 with this intimate contact state being sustained. As the securing method of the bearing member 7, press-fitting or adhesion may be employed. Incidentally, the shaft member 2 and the bearing member 7 may be separately inserted into the housing 6 as described above, or may be inserted all together.

Figure 8:
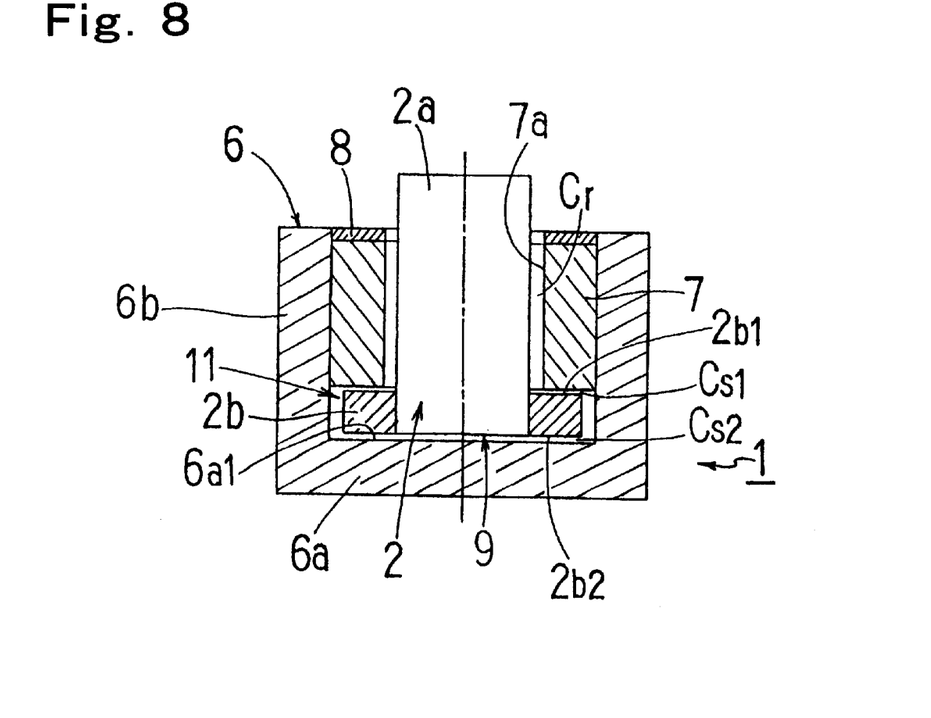
FIG. 8 is a cross-sectional view of the aforementioned dynamic pressure bearing-unit, showing a manufacturing procedure thereof.

Subsequently, a solvent is supplied to the inner diameter portion of the housing 6 to dissolve the resin sheet 12. Consequently, as shown in FIG. 8, the thrust bearing clearance (Cs1+Cs2) equivalent to the thickness δ of the resin sheet 12 is formed between the lower end surface of the bearing member 7 and the housing bottom 6a1. Thereafter, lubricating oil is applied to inside the housing 6 to fill the respective bearing clearances Cr, Cs1, Cs2 with the oil, and then the upper surface of the bearing member 7 is sealed with the sealing member 8 to obtain the bearing unit 1 shown in FIG. 5.

In this case, the sum of the width of both thrust bearing clearances Cs1, Cs2 is equivalent to the thickness δ of the resin sheet 12. Accordingly, only if the thickness δ is accurately defined, the thrust bearing clearances Cs1, Cs2 can be formed with high accuracy even in the case where the flange portion 2b, the housing 6, the bearing member 7 or the like has more or less a variation in dimensions. In addition, since this obviates the necessity to measure the dimensions of each member, the thrust bearing clearances Cs1, Cs2 with predetermined width can be formed readily at low cost.

Incidentally, in the aforementioned process, it is desirable to provide a groove for supplying the solvent on the outer periphery of the bearing member 7 so that the supplied solvent can reach smoothly the resin sheet 12. The groove, which also serves as an air vent, facilitates the insertion of the bearing member 7 into the housing 6 and prevents the air trapped in the thrust bearing clearances Cs1, Cs2 from being thermally expanded at the time of use to push the shaft member 2 upward.

Figure 9:
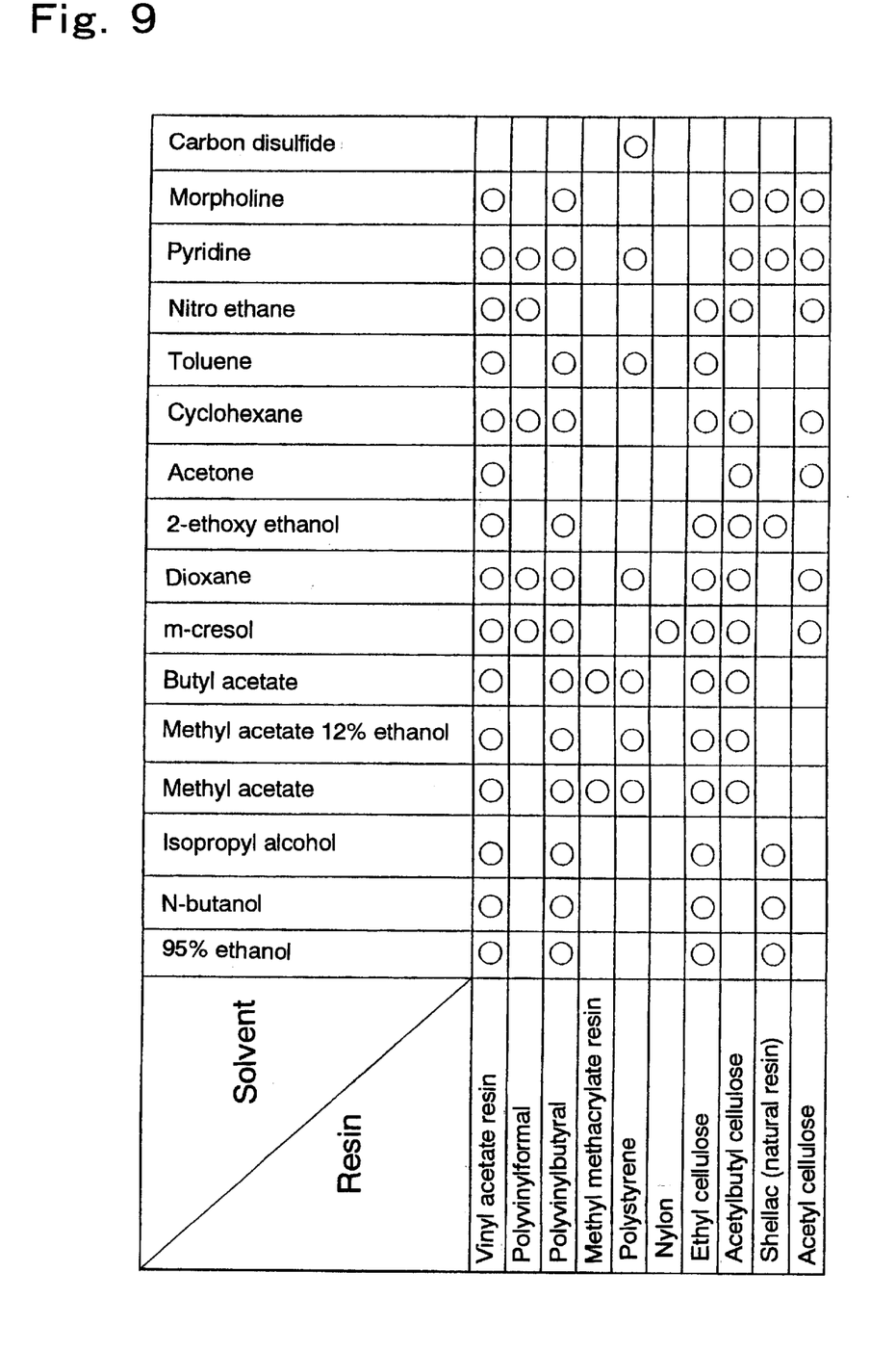
FIG. 9 is a list of the combinations of resins and solvents, which are applicable to the present invention.

The combination of a resist material of the resin sheet 12 and a solvent may be selected arbitrarily so long as the solvent dissolves the resin sheet 12 with reliability, however, chloride-containing resins, chloride-based solvents, or corrosive solvents are preferably excluded. FIG. 9 shows examples of specific possible combinations of resist materials and solvents with circles indicating the combinations.

The resin layer 12 may employ the resin sheet 12 as mentioned above and may be formed by coating a resin film on the housing bottom 6a1. In this case, the coating is formed, for example, by the steps of dissolving the resin in the solvent beforehand, supplying a given amount thereof to the housing bottom 6a1, and then spreading the resin by centrifugal force to allow the resin to dry. This method enables forming a film having a uniform thickness. The procedure for the assembly after the formation of the film is the same as that for the aforementioned resin sheet 12, and its explanation is not repeated here.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A dynamic pressure bearing-unit comprising:

a rotatable shaft member with a shaft that is perpendicular relative to a flange portion;

a fixed radial bearing portion that supports said shaft member in the radial direction; and a thrust bearing portion for supporting said flange portion of said shaft member in the direction of thrust, wherein said radial bearing portion and the thrust bearing portion support said shaft member by dynamic pressure action out of contact, respectively, said shaft and said flange portion being constructed in one piece, wherein the perpendicular arrangement of said shaft relative to said flange portion is completed before incorporating said shaft member into said bearing member to retain assembly accuracy.

2. The dynamic pressure bearing-unit according to claim 1, wherein a bearing member is arranged along an outer periphery of said shaft member, and a radial bearing clearance of said radial bearing portion is formed between the outer periphery of said shaft member and said bearing member facing thereto.

3. The dynamic pressure bearing-unit according to claim 2, wherein one end of said bearing member is sealed with a sealing member.

4. The dynamic pressure bearing-unit according to claim 1, wherein said thrust bearing portion has two thrust bearing clearances on both sides of said flange portion.

5. The dynamic pressure bearing-unit according to claim 4, wherein one end surface of said flange portion and said bearing member facing thereto form one of said thrust bearing clearances of said thrust bearing portion.

6. The dynamic pressure bearing-unit according to claim 5, wherein dynamic pressure grooves of said thrust bearing portion are provided on said bearing member.

7. The dynamic pressure bearing-unit according to claim 5, wherein dynamic pressure grooves of said thrust bearing portion are provided on said thrust support portion.

8. The dynamic pressure bearing-unit according to claim 4 or 5, wherein a thrust support portion is provided opposite to the other end surface of said flange portion, and said thrust support portion and said other end surface of said flange portion form the other one of said thrust bearing clearances of the said thrust bearing portion.

9. A dynamic pressure bearing-unit comprising; a housing; a bearing member fixed to said housing; a shaft member; and a radial bearing portion and a thrust bearing portion which make use of dynamic pressure action produced at the time of relative rotation between said shaft member and said bearing member to conduct non-contact support of said shaft member, wherein said housing has a straight inner periphery in the shape of a cylinder with a bottom, and bearing clearances of said thrust bearing portion can be appropriately set by controlling a position of said bearing member relative to said housing.

10. The dynamic pressure bearing-unit according to claim 9, wherein said bearing clearances of said thrust bearing portion are formed by removing a positioning means for positioning said bearing member relative to said housing.

* * * * *